US012578002B2

(12) United States Patent     (10) Patent No.:    US 12,578,002 B2
Ciotlos et al.                  (45) Date of Patent:         Mar. 17, 2026

(54) BELLOWS

(71) Applicant: Continental Automotive Technologies GmbH, Hannover (DE)

(72) Inventors: Adrian-Nicolae Ciotlos, Sibiu (RO); Constantin Popa, Ramnicu Valcea (RO)

(73) Assignee: AUMOVIO Germany GmbH

( * ) Notice: Subject to any disclaimer, the term of this patent is extended or adjusted under 35 U.S.C. 154(b) by 435 days.

(21) Appl. No.: 18/226,001

(22) Filed: Jul. 25, 2023

(65)         Prior Publication Data

US 2024/0026947 A1      Jan. 25, 2024

(30)       Foreign Application Priority Data

Jul. 25, 2022    (EP) .................................... 22465547

(51) Int. Cl.
     *F16J 3/04*          (2006.01)
     *F16F 9/38*          (2006.01)
(52) U.S. Cl.
     CPC .......... *F16F 9/38* (2013.01); *F16F 2230/105* (2013.01); *F16F 2234/02* (2013.01)
(58) Field of Classification Search
     CPC ........ F16J 3/04; F16J 3/041; F16J 3/00; F16J 15/52; F16L 27/11; F16L 51/02; F16L 51/025; F04B 45/02; F16F 9/38; B65D 88/18; G01F 15/16; F16K 41/10
     See application file for complete search history.

(56)             References Cited

U.S. PATENT DOCUMENTS

| | | | | |
|---|---|---|---|---|
| 3,270,905 A | * | 9/1966 | Kroekel | .................... F17C 1/00 220/666 |
| 3,326,091 A | * | 6/1967 | Allen | ........................ F16J 3/047 29/454 |
| 4,120,635 A | * | 10/1978 | Langecker | .............. B29C 49/70 425/522 |
| 4,927,191 A | * | 5/1990 | Mikol | ..................... F16L 27/11 285/423 |
| 4,947,696 A | * | 8/1990 | Fehlauer | .................. G01N 1/24 73/863.86 |
| 5,176,390 A | * | 1/1993 | Lallement | ................ F16J 3/041 403/50 |
| 6,105,815 A | * | 8/2000 | Mazda | ................. B65D 1/0292 220/666 |

(Continued)

FOREIGN PATENT DOCUMENTS

| | | |
|---|---|---|
| DE | 1210279 B | 2/1966 |
| DE | 29817842 U1 | 1/1999 |

(Continued)

*Primary Examiner* — Aaron M Dunwoody

(57)             ABSTRACT

A bellows formed from an elastic material with a cylinder jacket as a basic shape, a cylinder axis corresponding to a working direction, and a jacket surface shaped into a plurality of folds transversely with respect to the working direction. Each fold has a first fold diameter perpendicular to the working direction and spaced apart therefrom in the working direction, a second fold diameter differing from the first fold diameter and spaced apart therefrom in the working direction, against the first fold diameter, and a fold wall formed integrally therewith. Consecutive folds in the working direction each have the same inner fold diameter, but alternating different outer fold diameters.

2 Claims, 2 Drawing Sheets

(56) References Cited

U.S. PATENT DOCUMENTS

| | | | | | |
|---|---|---|---|---|---|
| 6,929,034 | B1 * | 8/2005 | Larsen | ................... | F16L 27/11 |
| | | | | | 285/227 |
| 8,523,690 | B2 * | 9/2013 | Takabe | ................... | F16D 3/845 |
| | | | | | 464/175 |
| 12,253,175 | B2 * | 3/2025 | Caruana | .................. | F16J 3/047 |
| 2006/0166750 | A1 * | 7/2006 | Renzo | ..................... | F16J 3/041 |
| | | | | | 464/175 |
| 2008/0308170 | A1 * | 12/2008 | Bock | ...................... | F16L 27/11 |
| | | | | | 138/109 |
| 2014/0035232 | A1 * | 2/2014 | Matsumura | ............ | B29C 49/04 |
| | | | | | 264/505 |
| 2015/0053299 | A1 * | 2/2015 | Schill | ..................... | F16L 27/10 |
| | | | | | 138/122 |
| 2015/0068855 | A1 * | 3/2015 | Matsumura | .............. | F16F 9/38 |
| | | | | | 188/322.12 |
| 2016/0033061 | A1 * | 2/2016 | Tatzreiter | ................ | F16J 3/047 |
| | | | | | 138/121 |
| 2016/0208917 | A1 * | 7/2016 | Nagamachi | .............. | F16F 9/38 |
| 2017/0307083 | A1 * | 10/2017 | Sato | .......................... | F16J 3/04 |
| 2018/0031130 | A1 * | 2/2018 | Berard | ............... | F16J 15/3452 |
| 2018/0259068 | A1 * | 9/2018 | Sato | ........................ | F16J 3/047 |
| 2020/0232559 | A1 * | 7/2020 | Arikawa | ................ | F16J 3/047 |
| 2022/0268360 | A1 * | 8/2022 | Caruana | .................. | F16J 3/047 |
| 2024/0026947 | A1 * | 1/2024 | Ciotlos | .................... | F16F 9/38 |
| 2024/0066937 | A1 * | 2/2024 | Song | ........................ | F16F 9/38 |
| 2024/0093814 | A1 * | 3/2024 | Mayer | .................... | F16L 25/01 |
| 2025/0215905 | A1 * | 7/2025 | Kurokawa | ............... | F15B 1/12 |

FOREIGN PATENT DOCUMENTS

| | | | |
|---|---|---|---|
| DE | 102020203171 | A1 | 8/2021 |
| JP | S55142756 | U | 10/1980 |

* cited by examiner

BELLOWS

CROSS-REFERENCE TO RELATED APPLICATIONS

This application claims priority to European patent application No. 22465547, filed Jul. 25, 2022, which is hereby incorporated by reference.

TECHNICAL FIELD

The technical field relates to a bellows for protecting a part, such as a motor vehicle spring.

BACKGROUND

Bellows are used as an elastic protective wall in particular around length-variable parts, for example around springs for motor vehicles. The bellows protects the spring against the penetration of dirt and moisture and also prevents direct access to the spring travel.

The bellows is formed from an elastic material, for example a rubber mixture, and has a cylinder jacket as the basic shape with a cylinder axis corresponding to the working direction and a jacket surface.

The jacket surface is folded, i.e., shaped into a plurality of folds substantially transversely with respect to the working direction.

The folds have a first fold diameter perpendicular to the working direction and, spaced apart therefrom in the working direction, a second fold diameter differing from the first fold diameter and, in turn, spaced apart therefrom in the working direction, again a first fold diameter, and a fold wall formed integrally therewith. In the inoperative position, the two fold walls are therefore at an angle defined by the distances between the fold diameters and therefore each fold can be expanded or compressed. The bellows is therefore designed to be correspondingly highly elastic in the working direction because of the expansion or closing of the folds.

The fold wall is frequently designed as a rectilinear surface or else is pre-shaped in a curved manner in order, for example, to achieve a preferred direction or a defined action of force. If the bellows is very greatly compressed or possibly also additionally loaded because of rotation of the part in the interior or because of centrifugal forces, the fold walls may come into contact with one another and may possibly adhere or stick to one another.

As such, it is desirable to present an improved refinement of the bellows, in which this risk is further minimized and the bellows can thus be permitted even for a high degree of compression.

SUMMARY

According to the one embodiment, provision is therefore made that consecutive folds in the working direction each have the same inner fold diameter, but different outer fold diameters, and are matched in shape to one another.

In addition to a second fold diameter for a fold, at least one fold adjacent thereto is provided with a third outer fold diameter which is larger than the second fold diameter. It is insignificant for the functioning whether the bellows begins or ends overall at its outermost folds with a fold of the second or third fold diameter on the outside, i.e. all that matters is the sequence of at least two folds which are optimized with respect to one another in this way.

The fold wall of the one fold with the smaller second fold diameter is pre-shaped convexly, i.e., curved outward.

By contrast, the fold wall of the adjacent fold with the larger third fold diameter is pre-shaped concavely, i.e. curved inward, at least in the overlapping region between the inner first fold diameter and the second fold diameter. The two fold walls are preferably shaped in such a manner that, even in the maximally compressed state, the convex fold wall still remains free from contact or at maximum with punctiform contact. Thus, even with maximum compression and possible rotary loading of the bellows, adhesion or sticking of the fold walls can be prevented.

In a particularly preferred refinement, the fold wall of the fold with the larger third fold diameter is then in turn pre-shaped convexly there, i.e. curved outward, in the outer region between the second fold diameter and the third fold diameter, i.e. on the outside of the overlapping region of the first and second fold.

BRIEF DESCRIPTION OF THE DRAWINGS

The invention will now be described in more detail below with reference to an exemplary embodiment with reference to the figures, in which.

DETAILED DESCRIPTION

Figure 1:
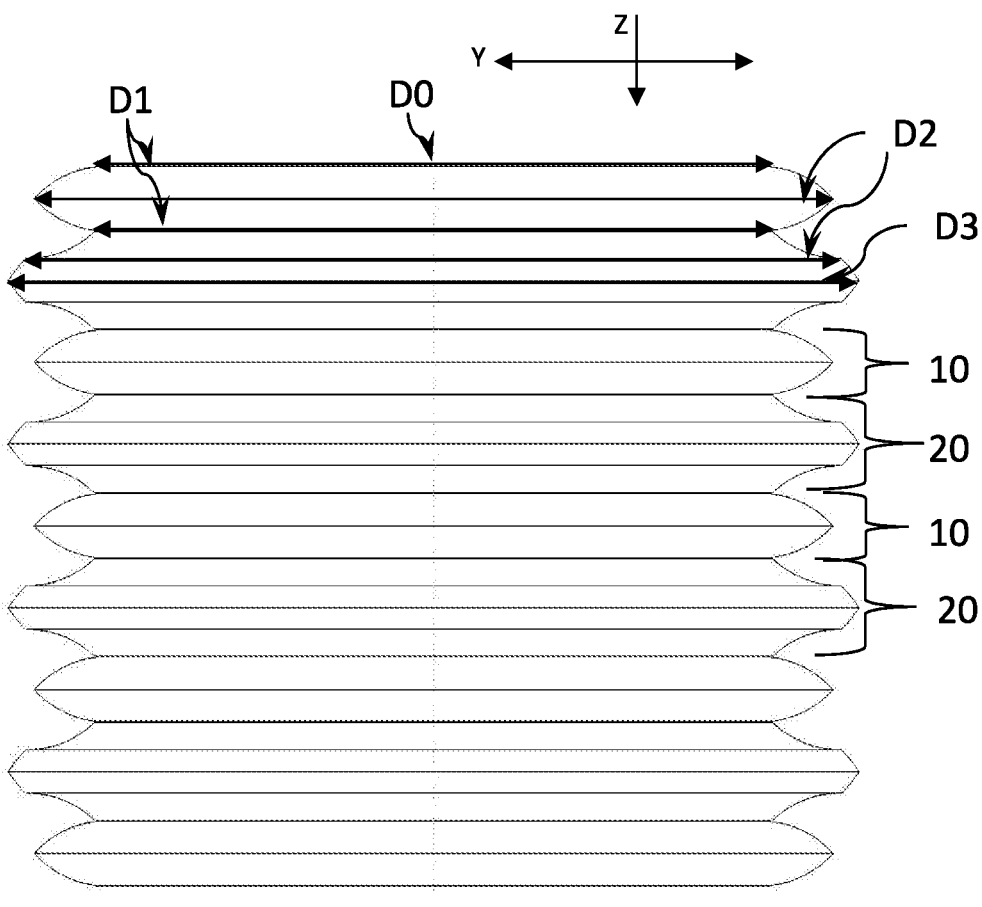
FIG. 1 shows an external overall view of a bellows according to one exemplary embodiment.

FIG. 1 shows a bellows as is used, for example, for protecting a part (not illustrated here) which is arranged in the interior of the bellows and is variable in length in the working direction (Z).

The bellows consists of an elastic material, for example a rubber mixture. It has a cylinder jacket as the basic shape with a cylinder axis DO corresponding to the working direction Z and a jacket surface which is arranged rotationally symmetrically thereto.

The jacket surface is shaped into a plurality of folds 10, 20 transversely with respect to the working direction Z and is therefore elastic in the working direction Z.

Each fold 10 or 20 has a circular cross-sectional area with a first fold diameter perpendicular to the working direction Z and, spaced apart therefrom in the working direction, a second fold diameter differing from the first fold diameter and, in turn, spaced apart therefrom in the working direction, again a first fold diameter, and a fold wall formed integrally therewith.

The bellows proposed here differs, however, in two essential details from the structural forms known previously from the prior art by, namely, firstly the respective outer fold diameters D2 and D3 alternating for consecutive folds and, in addition, the outer shaping of the fold walls being concave or convex in a manner coordinated with one another such that said fold walls can still be readily formed one in another, even at maximum compression, without coming into surface contact.

Therefore, consecutive folds 10, 20 in the working direction Z each have the same inner fold diameter D1, but different outer fold diameters D2 and D3, i.e. in addition to a second fold diameter D2 at the fold 10, at least one fold 20 also adjacent thereto is provided with a third outer fold diameter D3 which is larger than the second fold diameter. With which outer fold diameter or with which fold type the bellows in each case ends at the outer end is not crucial here.

Figure 2:
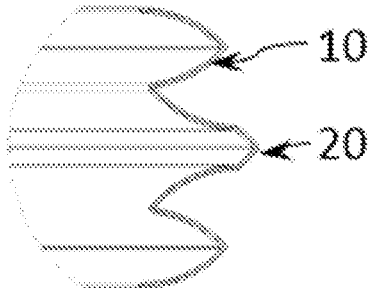
FIG. 2 shows a detail from a jacket region of the embodiment shown in FIG. 1.
Figures 3, 4, 5, 6:
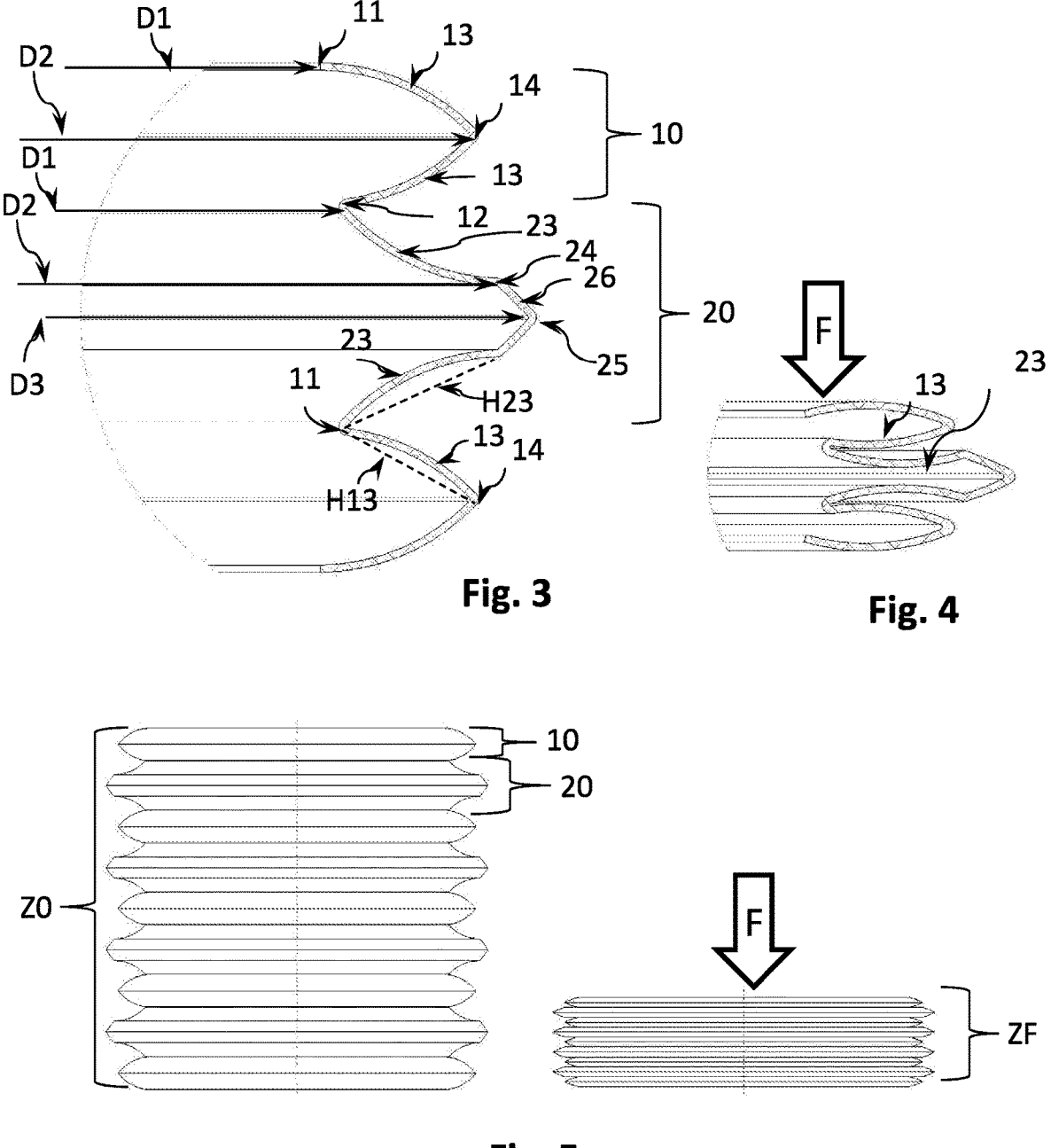
FIG. 3 shows an enlarged illustration of the detail shown in FIG. 2 of a wall of the bellows in an unloaded state.
FIG. 4 shows a detail from the jacket region of the bellows under maximum compression.
FIG. 5 shows the bellows uncompressed.
FIG. 6 shows the bellows according to FIG. 5 in the maximally compressed state

The fold wall 13 of the fold 10 with the smaller second fold diameter D2 is in each case pre-shaped convexly, i.e., curved outward, as can already be seen from FIG. 2, but even better from FIG. 3. The fold wall 13 thus specifically shows a convex, i.e., outwardly curved shape over the direct connecting line H 13, illustrated purely in sketch form for clarification purposes. The connecting line H 13 sketches the imaginary linear connection between the inner point 11 corresponding to the fold diameter D1 and the second outer fold diameter at point 14.

The fold wall 23 of the adjacent fold 20 has, on the outside, at point a, by contrast, larger third fold diameter D3 and, at least in the overlapping region, i.e. between the inner first fold diameter and the second fold diameter or between the inner point 12 and the central point 24 corresponding to the second fold diameter D2, is pre-shaped concavely, i.e. curved inward. This can in turn be clarified with reference to the connecting line H23 inserted in sketch form. In addition, the exemplary embodiments selected here each show the preferred development, according to which the fold wall 26 of the fold 20 with the larger third fold diameter D3 is pre-shaped convexly, i.e. curved outward, in the outer region, i.e. between the second fold diameter D2 and the third fold diameter D3, or between points 24 and 25.

The mutually coordinated shaping of the convexly outwardly curved fold wall 13 of the fold 10 and the concavely inwardly curved fold wall 23 of the fold can be seen, however, in FIG. 4 at the maximum compression of the bellows, in which the fold 10 is still not in surface contact with the fold 20 because of the concavely inwardly curved bulge of the fold 20.

As a result, an extremely great compression of a bellows from an extent Z0 in the inoperative position according to FIG. 5 as far as an extent ZF under the action of force F in the working direction X of significantly more than 50%, preferably approximately 75%, may be achieved.

The invention claimed is:

1. A bellows for protecting a part which is arranged in the interior of the bellows and is variable in length in a working direction, the bellows comprising:

an elastic material defining a cylinder jacket with a cylinder axis corresponding to the working direction and having a jacket surface which is shaped into a plurality of folds transversely with respect to the working direction and is therefore elastic in the working direction, each fold having a first fold diameter perpendicular to the working direction and spaced apart therefrom in the working direction, a second fold diameter differing from the first fold diameter and spaced apart therefrom in the working direction, against the first fold diameter, and a fold wall formed integrally therewith, wherein consecutive folds in the working direction each have the same inner fold diameter, but different outer fold diameters, such that in addition to a second fold diameter, at least one fold adjacent thereto is also provided with a third outer fold diameter which is larger than the second fold diameter, and the fold wall of the fold with the smaller second fold diameter is in each case pre-shaped convexly while the fold wall of the adjacent fold with the larger third fold diameter is pre-shaped concavely at least in the overlapping region between the inner first fold diameter and the second fold diameter.

2. The bellows as claimed in claim 1, wherein the fold wall of the fold with the larger third fold diameter is pre-shaped convexly in the outer region between the second fold diameter and the third fold diameter.

\* \* \* \* \*